Aug. 8, 1950  W. A. FRANK  2,517,780
PIPE LINING DEVICE
Filed Feb. 24, 1947
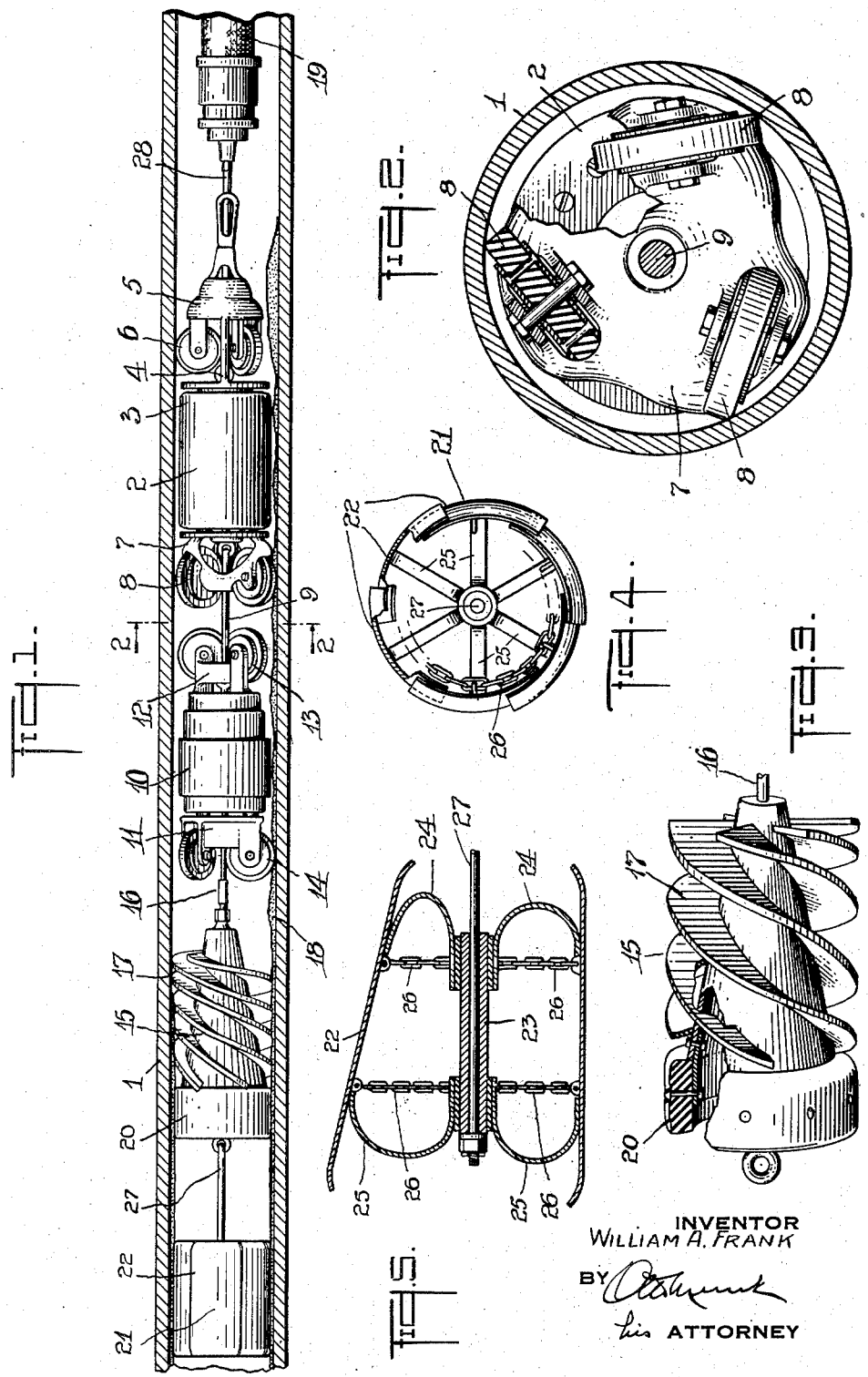
INVENTOR
WILLIAM A. FRANK
BY
his ATTORNEY Patented Aug. 8, 1950

2,517,780

UNITED STATES PATENT OFFICE 2,517,780

PIPE LINING DEVICE

William A. Frank, Hackensack, N. J.

Application February 24, 1947, Serial No. 730,379

8 Claims. (Cl. 25—38)

The present invention relates to an improved apparatus for applying linings or coatings to the interior of tubular members and more particularly to the application of cementitious or other plastic material to the inner wall of underground conduits such as water mains or the like.

It is primarily an object of the present invention to provide a device which is positive in operation and requires a minimum of adjustment or manipulation while applying a smooth coat of the lining material as it is drawn or otherwise moved through the conduit.

A further object of the invention is to provide a pipe lining device which automatically distributes an even coating of the cementitious or other plastic material on the inner wall of the pipe.

Other objects and advantages of the invention will become apparent on consideration of the following description and accompanying drawings wherein:

Figure 1 is a sectional view of a conduit schematically showing the improved device in operative position.

Figure 2 is a sectional view on the line 2—2 of Figure 1.

Figure 3 is an elevation partly in section of the applicator.

Figure 4 is a transverse sectional view through the improved trowel shown as an element of Figure 1.

Figure 5 is a longitudinal section of the trowel shown in Figure 1.

The improved pipe lining device of the present invention in general includes a power unit, a speed reducer, an applicator and means for preventing rotation of the power unit relative to the pipe. In the preferred form of the invention the device also includes a novel form of trowel for the purpose of finally smoothing the coating of material applied to the interior wall of the pipe by the applicator. The several elements of the device are preferably arranged in the illustrated sequence, namely with the power unit at the head of the device, followed by the speed reducer, the applicator and the trowel in the indicated order although a different order may be followed in certain applications. The combination may be drawn through the pipe by a cable which carries the electric current for operating the motor in the power unit and draws the machine through the pipe or the device may be moved through the pipe by other suitable means.

Referring to the drawings Figure 1 illustrates the application of the invention to the lining of a pipe 1 of relatively small diameter. The power unit 2 comprises a small motor enclosed in a water-tight shell 3 provided at the head end with a bracket 4 which terminates in a spider 5 carrying a plurality of rollers 6 of rubber or other suitable resilient material arranged so as to press firmly at an angle against the inner wall of the pipe in the nature of a secant, as a line drawn through the center of the wheels at right angles to the axis thereof would pass through the pipe bore at two points. Suitably mounted on the opposite or trailing end of the power unit 2 is a shell-like bracket 7 which also carries a plurality of resilient rollers 8 likewise arranged at an angle to firmly engage the inner wall of the pipe. Connected to the power unit 2 by means of a drive shaft 9 is a speed reducer 10 provided at the rear with a bracket 11 and at the front with a bracket 12. The brackets 11 and 12 are provided with rollers 13 and 14 similarly mounted to those of the power unit 2. The speed reducer 10 is used in combination with a small motor in power unit 2 of relatively high-power, high-speed output so as to produce substantial torque for rotation of the applicator 15. The power unit 2, speed reducer 10 are centered within the pipe 1 and prevented from rotating by means of the sets of rollers 6, 8, 13, and 14 which press tightly against the side wall of the pipe at an angle in opposition to rotation which would tend to occur in a direction opposite to that of the applicator.

To the rear of the speed reducer 10 is drawn the applicator 15 by means of a drive shaft 16 which rotates the applicator at a reduced speed but increased torque due to the speed reducer 10. The applicator 15 consists of a conical body centered within the pipe 1 by radial spiral blading 17 formed of a suitably resilient material such as rubber connected to the cone. Thin steel blading may be employed instead of rubber. The spiral blading or helix 17 has a uniform extreme or outside diameter along its length on the cone, but this diameter is less than that of the pipe bore to be lined, as shown in Figure 1 of the drawing.

In operation the applicator 15 as it is drawn through the pipe 1 by the power unit 2 and the speed reducer 10 picks up the cementitious material 18 from the lower portion of the pipe 1 where it has been deposited by the hose 19 or other means and evenly distributes said material about the interior of the pipe 1. Mounted on the base of the applicator is a circular rubber ring 20 of slightly smaller diameter than the interior bore of the pipe for the purpose of levelling and smoothing the coating which has been distributed on the interior of the pipe by the applicator blading 17. The applicator 15 produces a relatively uniform coating of the lining material but may leave it slightly rough on the inner surface which is smoothed by the following means:

To the rear of the applicator 15 is drawn a trowelling member 21 consisting of a plurality of segmental plates 22 of relatively thin steel or other material curved to the inner contour of the pipe. The plates 22 are disposed in overlapping relationship as shown in Figure 4 so as to present a continuous surface to the cement lining and curved or beveled on the leading and trailing edges. The plates 22 are connected to a central sleeve 23 by spring expansion elements 24 and 25 tending to cause the plates 22 to assume the position shown in the upper portion of Figure 5. Connecting the plates 22 with the sleeve 23 are chains 26 which limit the outward movement of the plates 22. When the unit moves through the pipe the plates 22 are compressed as shown in the lower section of Figure 5 to give the trowel 21 a cylindrical shape. The trowel 21 is connected with the applicator 15 by a rod 27 swivelled to the sleeve 23 so that the trowel does not rotate with the applicator.

The device may be towed or drawn through the pipe by a cable 28 carrying the electrical current for operating the motor. The cable 28 is shown emerging from the hose 19 which may deposit the cementitious lining material in the pipe.

Although the elements are shown in train form which may be preferred for rounding bends in relatively small diameter pipe this arrangement is not always essential and may not be desired for relatively straight pipe.

I claim:

1. A pipe lining device comprising an applicator for disposing the lining material concentrically in the pipe and a trowel constructed of a plurality of segmental plates in substantially cylindrical formation and expansible radially to perform a smoothing operation on the coating.

2. A pipe lining device comprising an applicator for disposing the lining material concentrically in the pipe and a smoothing device for performing a smoothing operation on said material, comprising a supporting member, a series of trowel members extending radially about said support in substantially cylindrical formation and resiliently connected thereto, and means for limiting the movement of said trowel members with respect to said support.

3. A pipe lining device comprising an applicator for disposing the lining material concentrically in the pipe and a smoothing device for performing a smoothing operation on said material comprising a supporting member, a series of trowel members extending radially about said support and resiliently connected thereto, said trowel members being arranged in overlapping relation with respect to one another.

4. A pipe lining device comprising an applicator for disposing the lining material concentrically in the pipe bore in situ, and a smoothing device for performing a smoothing operation on said material comprising a support, a series of trowel members in substantially cylindrical formation extending radially about said support, leaf spring members connecting said trowel members and support, and additional means connecting said trowel members and support to limit the radial extension of said trowel members.

5. A pipe lining device comprising in combination a rotary applicator for distributing plastic lining material concentrically about the interior wall of the pipe in situ, and a power unit for rotating said applicator, rotary means on said power unit disposed at each end thereof at radially spaced points about the body of said unit to space said unit from the wall of the surface being lined, said rotary means being so constructed and arranged on said unit as to resist the counter-rotational force exerted by said applicator on said power unit to prevent rotation of said power unit.

6. A pipe lining device comprising in combination a rotary applicator for distributing plastic lining material concentrically about the interior wall of the pipe, a power unit for rotating said applicator and rollers on said power unit disposed at each end thereof at radially spaced points about the body of said unit to space said body from the wall of the pipe, said rollers being arranged at a secant with respect to the pipe bore and extending in a direction to resist the counter-rotational force exerted by said applicator to prevent rotation of said power unit.

7. An applicator for a pipe lining device for distributing and applying plastic lining in pipes in situ, comprising a rotatable cone shaped member adapted for axial movement along a pipe, and a yieldable helix connected to said cone about the periphery thereof, the extreme diameter of said helix being substantially uniform along its length on said cone, but being less than the diameter of the pipe bore to be lined.

8. An applicator for a pipe lining device for distributing and applying plastic lining in pipes in situ, comprising a rotatable cone shaped member adapted for axial movement along a pipe, and a yieldable helix connected to said cone about the periphery thereof, the extreme diameter of said helix being substantially uniform along its length on said cone, but being less than the diameter of the pipe bore to be lined, said helix distributing the lining material as it moves along the bore of the pipe, the small end of the cone forming the leading edge thereof and the base of the cone forming the trailing edge thereof, and a resilient band fixed to the base of the cone to level the material distributed about said bore.

WILLIAM A. FRANK.

REFERENCES CITED

The following references are of record in the file of this patent:

UNITED STATES PATENTS

| Number | Name | Date |
| --- | --- | --- |
| 152,218 | Dickenson | June 23, 1874 |
| 1,629,292 | Newsom | May 17, 1927 |
| 2,026,470 | Haskins et al. | Dec. 31, 1935 |
| 2,090,851 | Perkins | Aug. 24, 1937 |
| 2,204,785 | Bennett | June 18, 1940 |
| 2,220,975 | O'Rahilly | Nov. 12, 1940 |
| 2,231,250 | Bryan | Feb. 11, 1941 |
| 2,377,615 | Crane | June 5, 1945 |